United States Patent
Schmutz et al.

(10) Patent No.: US 6,687,509 B2
(45) Date of Patent: Feb. 3, 2004

(54) BACKHAUL POWER CONTROL SYSTEM IN A WIRELESS REPEATER

(75) Inventors: Thomas R. Schmutz, Indialantic, FL (US); Michael A. Komara, Indialantic, FL (US)

(73) Assignee: Airnet Communications Corporation, Melbourne, FL (US)

( * ) Notice: Subject to any disclaimer, the term of this patent is extended or adjusted under 35 U.S.C. 154(b) by 490 days.

(21) Appl. No.: 09/726,874

(22) Filed: Nov. 30, 2000

(65) Prior Publication Data

US 2002/0065094 A1 May 30, 2002

Related U.S. Application Data

(60) Provisional application No. 60/173,443, filed on Dec. 29, 1999.

(51) Int. Cl.[7] .............................................. H04B 7/00
(52) U.S. Cl. ..................... 455/522; 455/69; 370/315; 370/318
(58) Field of Search .................... 455/522, 69, 445, 455/455, 7, 8, 9, 13.4, 12.1, 13.1, 515, 68; 370/330, 331, 322, 328, 315, 316, 318, 319, 321, 329, 332

(56) References Cited

U.S. PATENT DOCUMENTS

| | | | |
|---|---|---|---|
| 4,777,653 A | 10/1988 | Bonnerot et al. | |
| 5,479,400 A | * 12/1995 | Dilworth et al. | 370/60 |
| 5,806,003 A | * 9/1998 | Jolma et al. | 455/522 |
| 5,878,329 A | * 3/1999 | Mallinckrodt | 455/69 |
| 5,970,410 A | 10/1999 | Carney et al. | |

OTHER PUBLICATIONS

Rappaport, "Wireless Communcations" 1996, Prentice Hall Publications, p. 505–512.*

* cited by examiner

Primary Examiner—Nay Maung
Assistant Examiner—Tanmay Lele
(74) Attorney, Agent, or Firm—Sacco & Assoc., P.A.

(57) ABSTRACT

A method and apparatus for dynamically controlling signal power levels in a bi-directional backhaul communication link between a base station and a repeater station is provided. The signal power level of a signal transmitted between a base station and a repeater station is measured at the receiver of the signal. Once the received signal power level has been measured, the power level data based on the received signal power level is automatically transmitted from the receiving station back to the source of the measured signal over the backhaul link. Upon receipt at the source, the power level data is extracted and analyzed to determine if the source needs to alter its transmitted power. Once the power level data is analyzed to determine if a change in the transmitted power is required, the source can automatically respond by increasing, decreasing, or maintaining the transmitted power.

17 Claims, 10 Drawing Sheets

BACKHAUL POWER CONTROL SYSTEM IN A WIRELESS REPEATER

CROSS REFERENCE TO RELATED APPLICATIONS

This application is related to and claims priority from U.S. Provisional Application No. 60/173,443 entitled "BACKHAUL POWER CONTROL SYSTEM IN A WIRELESS REPEATER" filed Dec. 29, 1999, the entirety of which is incorporated herein by reference.

BACKGROUND OF THE INVENTION

1. Field of the Invention

This invention relates to a method for providing dynamic control of signal power levels in a bidirectional backhaul communication link between the base station and the repeater station in a wireless cellular communication system. More specifically, the invention relates to power controlling apparatus in both the base station and repeater station which uses suitable hardware and software to dynamically control the signal power levels between the base station and repeater.

2. Description of Related Art

In the field of wireless cellular communication, demand for services is constantly increasing. Typically, the operators of analog and digital cellular telephony services are required to upgrade the capacity of their systems within a given service area as customer demand grows. To meet the needs of an increased number of subscribers in a predefined service area, the service provider must modify the existing equipment to accommodate the increased traffic demands of a growing number of users.

A typical cellular phone system architecture includes a network of cells, mobile radio units, and a base transceiver station (BTS) located within each cell. The BTS is controlled by a central base station controller (BSC), and both are connected to a mobile telecommunications switching office (MTSO). The MTSO in turn routes calls to a standard public switched telephone network (PSTN) for land line communications. Increasing numbers of subscribers place a growing demand on the BTS to service an ever increasing number of calls in its respective cell. As a result of this increased demand on BTS capacity, BTS technology is constantly being improved and upgraded.

One way of alleviating increased BTS demand is described in U.S. Pat. No. 5,970,410 by Carney et al (Carney), entitled "Cellular System Plan Using In Band Translators to Enable Efficient Deployment of High Capacity Base Transceiver Systems." Instead of placing a base station in each cell, Carney describes a system with a home base station located in central cell serving one or more repeater stations located in substantially adjacent cells. Communication signals from mobile transceiver units located in the cells served by repeater stations are received by the repeater station and are then sent to the serving home base station via a backhaul communication link. The backhaul link is a bi-directional radio link between the serving base station and the associated repeaters, and provides the backbone communication link between the base station and the repeaters.

In a Carney-type repeater-based system, both the repeater stations and the base stations are initially deployed so that the backhaul link operates at a fixed, predetermined signal power level. However, if any conditions occur that might cause the backhaul signal strength of the received signal at the base station or repeater to vary, neither the base station nor the repeater can, without technician intervention, modify its transmitted signal strength to ensure that the signal is received at its required level.

Certain terrestrial conditions, such as fading caused by a water surface or attenuation due to changing atmospheric conditions, can cause the received signal power levels at the base station repeater to drop by as much as 30 dB. If the power level drops below a minimum threshold level, then the signal may be lost. Furthermore, if the backhaul channel signal is received by the repeater at a signal power level less than the minimum level control range (e.g., −95 dBm), then the level at which the signal is re-transmitted to the mobile station is transmitted at the same reduced signal power level. For example, if the backhaul signal power level received by the repeater is −98 dBm, then the signal is re-transmitted to the mobile station at +43 dBm, or 3 dB below the nominal specified transmission level of +46 dBm. In such cases where the backhaul signal is received by the repeater at levels below −95 dBm, the signal may be lost by the mobile receiver and the call dropped. This presents an intermittent maintenance problem to ensure proper operation of the system.

In addition, different distances between the home base station and the repeater stations require different transmit power levels to ensure that the received backhaul channel power levels are within a predetermined installation target level. This means that a qualified service technician must be available upon installation of the repeater to set the transmitter output power to a suitable level. Further, another technician is required at the base station receiving end to provide feedback to the remotely located technician regarding received signal strength. The time and expense involved in such installation procedure is undesirable.

Presently, in cellular systems, including repeaters, the only way to compensate for varying received backhaul signal power levels caused by terrestrial and atmospheric conditions is to manually adjust the transmit power levels at the repeater stations in the field. Similarly, manual setup adjustments need to be performed for transmitter signal power levels due to different distances between repeaters and base stations. Technicians are required to visit the repeater station site and to physically adjust the transmit power accordingly when received power levels are not within a predetermined target level. Manual field adjustment is an unsatisfactory solution because it requires time consuming, expensive maintenance and monitoring of repeater stations. Further, the transient nature of signal fading is problematic, requiring repeat visits to the site as the condition changes over time. In addition, repeaters must be located close enough to the base station to guarantee that received backhaul signal levels remain at a predetermined target level, despite transient variations caused by external conditions.

SUMMARY OF THE INVENTION

The invention concerns a wireless cellular communication system having a base station located within a home cell and at least one substantially adjacent cell. The adjacent cell has a repeater station located therein for facilitating communication between the base station and mobile units located in the adjacent cells. In one embodiment, the invention provides a method for dynamic control of signal power levels in a bi-directional backhaul communication link between the base station and the repeater station. In this embodiment, a received signal power level of a signal transmitted between the base station and the repeater station is measured in a receiving one of either the base station or the repeater station. Power level data is produced, based on the measured received signal power level and is then automatically transmitted to either the base station or repeater station which was the source of the signal. Finally, the source of the measured signal receives the power level data. The method can further include automatically adjusting the power level transmitted by the source of the measured signal when the power level data indicates that the received signal power level has deviated from a predetermined power level.

According to one embodiment, the power level data indicates the received signal power. Alternatively, the power level data may be a request directed to the source to control the transmitted power for increasing, decreasing, or maintaining the transmitted power.

The method can further include transmitting the power level data within a defined channel of the backhaul link assigned to at least one of the mobile units. According to one aspect of the invention, the backhaul link is a time division multiplex (TDM) type channel. Further, the invention can include a method for monitoring the backhaul communication link to identify an available TDM time slot and transmitting the power level data within the available time slot. According to one embodiment, the available time slot is a mobile unit control channel time slot. The method can further include suppressing the control channel data received from the mobile units in the control channel time slot when transmitting the power level data in the control channel time slot.

In another embodiment, the invention further provides an apparatus for dynamic control of signal power levels in a bi-directional backhaul communication link between the base station and the repeater station. This embodiment provides suitable signal processing circuitry and/or software to measure a received signal power level of a signal transmitted between the base station and the repeater signal power in a receiving one of either the base station or the repeater station. Modulating, transmitting, and associated control circuitry and/or software is also provided to automatically transmit power level data to the source of the measured signal. This power level data is produced based on the received signal power level from the receiving base station or repeater. In addition, receiving and associated control circuitry and/or software is provided in the source to receive the power level data. The invention can also include suitable control circuitry, or software, or a combination thereof, to automatically adjust the power level transmitted by the source of the measured signal when the power level data indicates that the received signal power level has deviated from a predetermined power level.

According to one embodiment, the power level data can be the received signal power level. In an alternative embodiment, appropriate circuitry and/or software can be provided so that the power level data may be encoded as a request directed to the source to control the transmitted power for increasing, decreasing, or maintaining the transmitted power.

The invention can further include modulating, transmitting and associated control circuitry and/or software to transmit the power level data within a defined channel of the backhaul link assigned to at least one of the mobile units. The power level data can then be transmitted using appropriate modulating, transmitting and associated control circuitry and/or software together with either the control or traffic data within the defined channel of the backhaul link which is assigned to the mobile unit.

According to another aspect of the invention, the backhaul link is a time division multiplex (TDM) type channel. Further, suitable signal processing circuitry and/or software can be provided for monitoring the backhaul communication link. This circuitry and/or software can identify an available TDM time slot and can transmit the power level data within the available time slot. According to one embodiment, the available time slot is a mobile unit control channel time slot. In that case, suitable signal processing circuitry and/or software can be provided to suppress the control channel data received from the mobile units in the control channel time slot when transmitting the power level data therein.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE INVENTION

Figure 1:
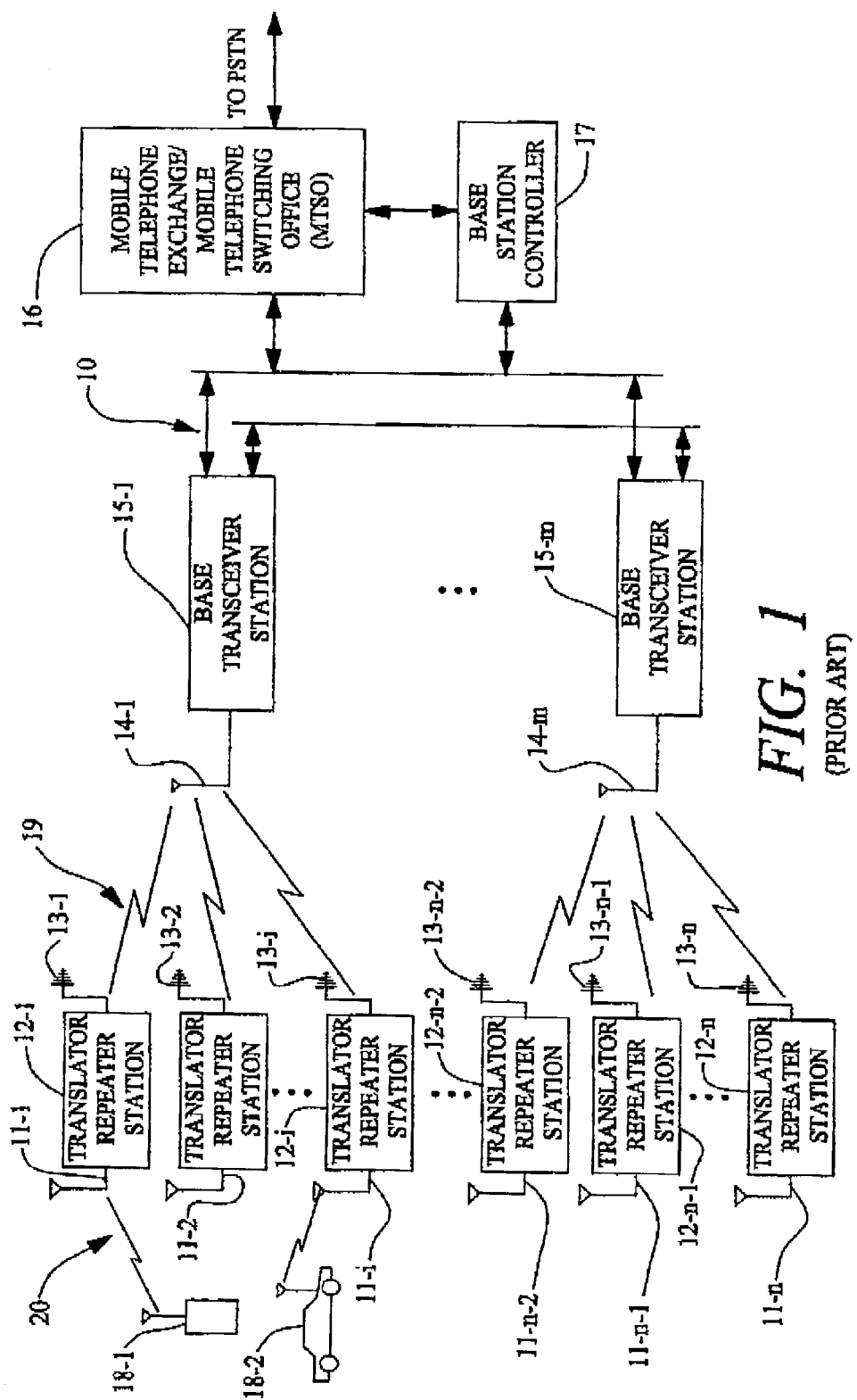
FIG. 1 is a block diagram of a wireless communications system employing wireless translating repeater station and base transceiver stations.

FIG. 1 is a block diagram of a conventional wireless communications system such as a Personal Communication System ("PCS") or other similar system. In this system, single-omni directional type wireless repeaters, such as translating repeaters, are deployed in peripheral cells of a cell cluster to concentrate radio signal traffic to and from a broadband base transceiver station ("BTS"). Those skilled in the art will readily appreciate that sectorized wireless repeaters can also be used for this purpose. However, for convenience, the system will first be described relative to the single omni-directional type repeater system.

The system 10 can include omni-directional antennas 11-1, 11-2, . . . 11-$i$, . . . 11-$n$-2, 11-$n$-1 and 11-$n$ (collectively omni-directional antennas 11), translating repeater stations 12-1, 12-2, . . . 12-$i$, . . . 12-$n$-2, 12-$n$-1 and 12-$n$ (collectively translating repeater stations 12), directional antennas 13-1, 13-2, . . . 13-$i$, . . . 13-$n$-2, 13-$n$-1 and 13-$n$ (collectively directional antennas 13), BTS directional antennas 14-1, . . .

14-*m* (collectively BTS antennas 14), and broadband base transceiver stations 15-1, . . . 15-*m* (collectively BTS's 15). The system 10 can further include a mobile telephone exchange 16, one or more base station controllers 17, and a plurality of mobile subscriber units 18-1 and 18-2 (collectively mobile units 18).

Translating repeater stations 12 conventionally receive radio signals from mobile units 18 through omni-directional antennas 11 and forward them to BTSs 15 through directional antennas 13. Likewise, radio signals transmitted from BTSs 15 through BTS antennas 14 are forwarded by translating repeaters stations 12 to mobile units 18. BTSs 15 are responsible for demodulating signals received from translating repeaters stations 12 through BTS antennas 14 and connecting these signals to the Public Switched Telephone Network ("PSTN") through mobile telephone exchange 16. In addition, BTSs 15 modulate signals received from the PSTN through mobile switching center 16 to format them for transmission through BTS antennas 14 to translating repeater stations 12.

Figure 2:
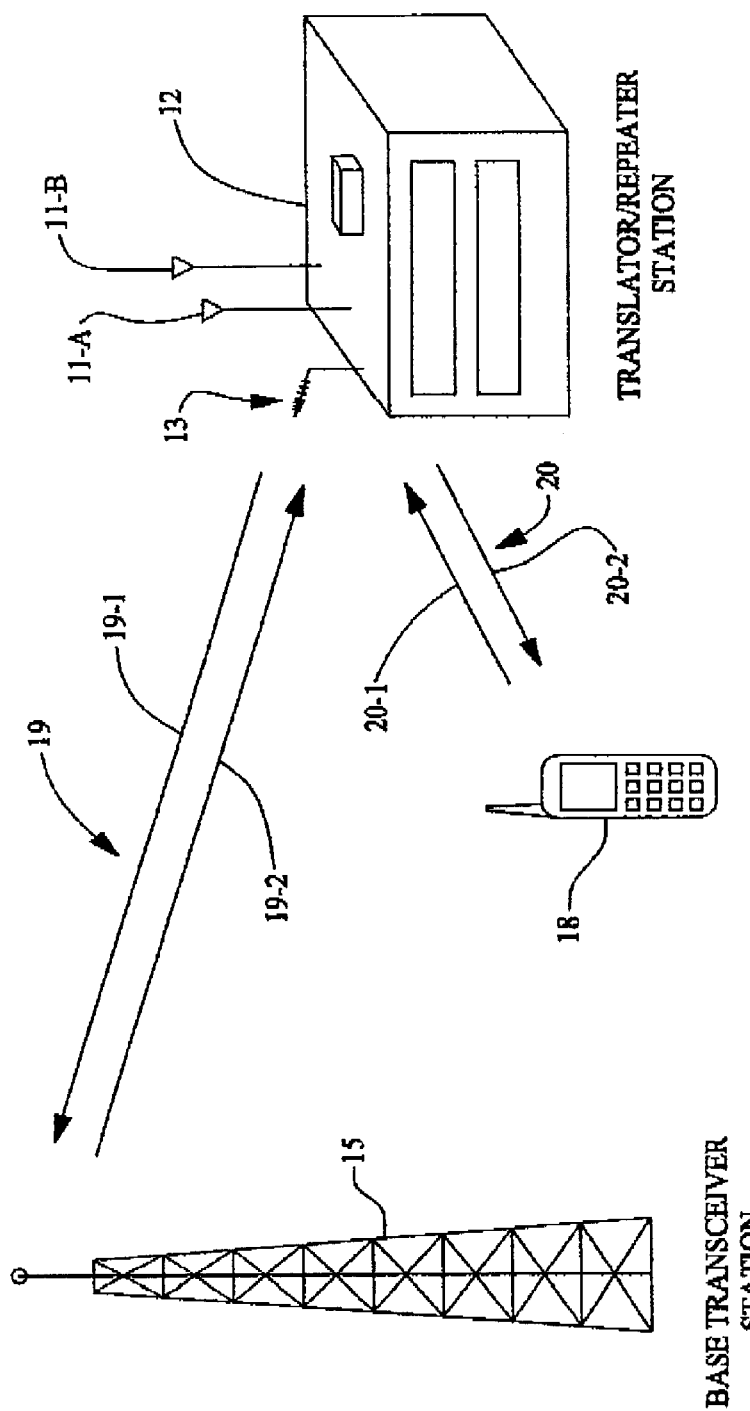
FIG. 2 is an exemplary arrangement of the wireless communications system of FIG. 1 showing how wireless links are deployed through the wireless repeater.

FIG. 2 illustrates the basic operation of translating repeater stations 12. In particular, translating repeater station 12 transmits signals to and receives signals from BTS 15 through backhaul channel 19. Similarly, translating repeater station 12 transmits signals to and receives signals from mobile unit 18 through ground link channel 20. Each of the ground link channel 20 and the backhaul channel 19 is defined by an uplink carrier frequency and a downlink carrier frequency. Because BTS 15 is stationary, translating repeater station 12 preferably employs directional antenna 13 to transmit and receive signals over backhaul channel 19. In contrast, because mobile units 18 are not stationary and the translating repeater station is not sectorized, translating repeater station 12 preferably employs one or more omni-directional antennas 11A and 11B respectively to transmit and receive signals over ground link channel 20.

Figure 3A:
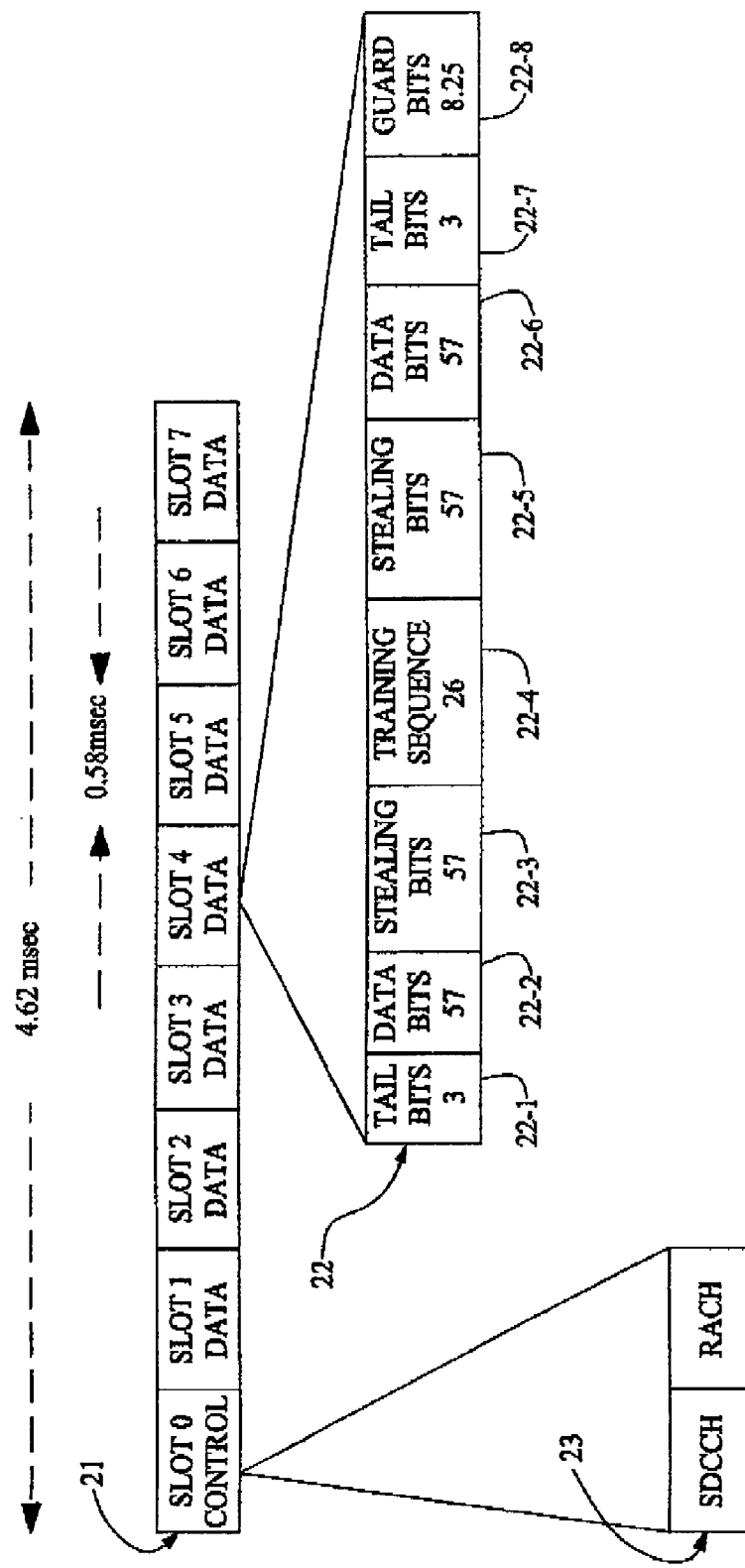
FIG. 3a illustrates an uplink GSM-type TDM time frame.

Communications between mobile units, repeaters, and the base station can be performed using a variety of multiplexing schemes that are well known in the art. For example, a time division multiplex (TDM) scheme may be used for this purpose. FIG. 3*a* shows a typical uplink GSM TDM frame 21 comprising eight time slots, used for transmission from a mobile unit 18 to a BTS 15. The depicted GSM TDM frame has a duration of 4.62 milliseconds, including eight time slots of 0.58 milliseconds each. A sequence of digital bits makes up each time slot. Portions of a time slot, or sub-time slots, are generally assigned specific functions and are referred to herein as sub-channels. Time slots can be configured to support user traffic or can be used for system control information. Generally, for GSM-type TDM implementations using a single RF carrier, one time slot is dedicated to transmitting control information, while the remaining slots are available to transmit traffic information. Traffic channels can carry voice conversations or data, as well as information about the time slot itself.

In frame 21 of FIG. 3*a* slot 0 contains control information and slots 1–7 contain traffic data. Typical formats for the traffic and control sub-channels are shown in time slot details 22 and 23, respectively. Detail 22 of time slot 4 shows typical GSM format traffic sub-channels including tail bits 22-1, 22-7 used to indicate the beginning and end of a time slot, data bits 22-2, 22-6 which contain the digitized call information, and training sequence bits 22-4 used for equalization of multi-path signals. Stealing bits 22-3, 22-5 are provided to indicate if suppression of time slot data and replacement with priority data is requested. Finally, guard bits 22-8 are provided to keep the time frames separate. The number of bits contained in a typical traffic sub-channel is shown below the sub-channel designation in detail 22.

As noted earlier, in single TDMA RF carrier implementations, one time slot will generally be a dedicated digital control channel. As shown in detail 23 of time slot 0, sub-channels in the uplink control time slot generally include a stand-alone dedicated control sub-channel (SDCCH) 23-1 and a random access sub-channel (RACH) 23-2. The SDCCH sub-channel 23-1 is used to transport information between the base station and a specific mobile unit to complete call set up or for transmission of messages for a mobile unit in idle mode. The RACH sub-channel 23-2 is used by the mobile unit to request access to the network during initial call set up.

Figure 3B:
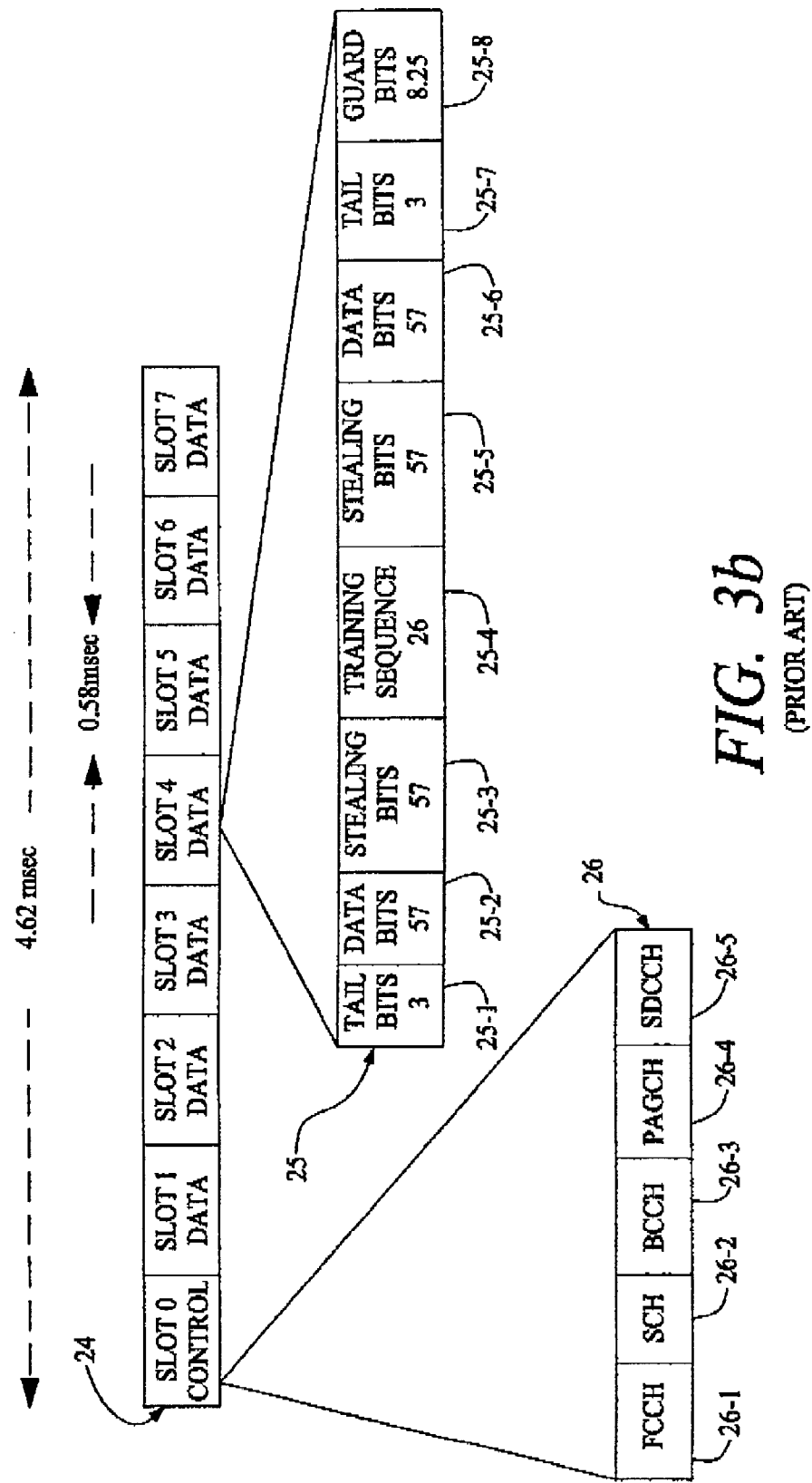
FIG. 3b illustrates a downlink GSM-type TDM time frame.

FIG. 3*b* shows a typical GSM-type eight slot TDM frame 24 used in downlink, base-to-mobile communications. Generally, the information format in the traffic time slots 1–7 remains the same, but more sub-channel data is included in the control time slot 0 as shown in detail 26. Specifically, a frequency correction sub-channel (FCCH) 26-1, synchronization sub-channel (SCH) 26-2, broadcast control sub-channel (BCCH) 26-3, paging and access grant sub-channel (PAGCH) 26-4, are added to the SDCCH sub-channel 26-5 in the downlink control time slot. However, the RACH sub-channel 23-2 is not included in the downlink signal. The FCCH sub-channel 26-1 transmits frequency correction information for a mobile unit to correct its time base, while the SCH 26-2 sub-channel transmits synchronization information for the mobile to synchronize to the framing structure of the network. The BCCH 26-3 sub-channel transmits information to idle mobile units such as local area identification and neighbor cell information. Finally, the PAGCH 26-4 sub-channel is used to page a mobile and grant access to a mobile unit during call set up.

Figure 4:
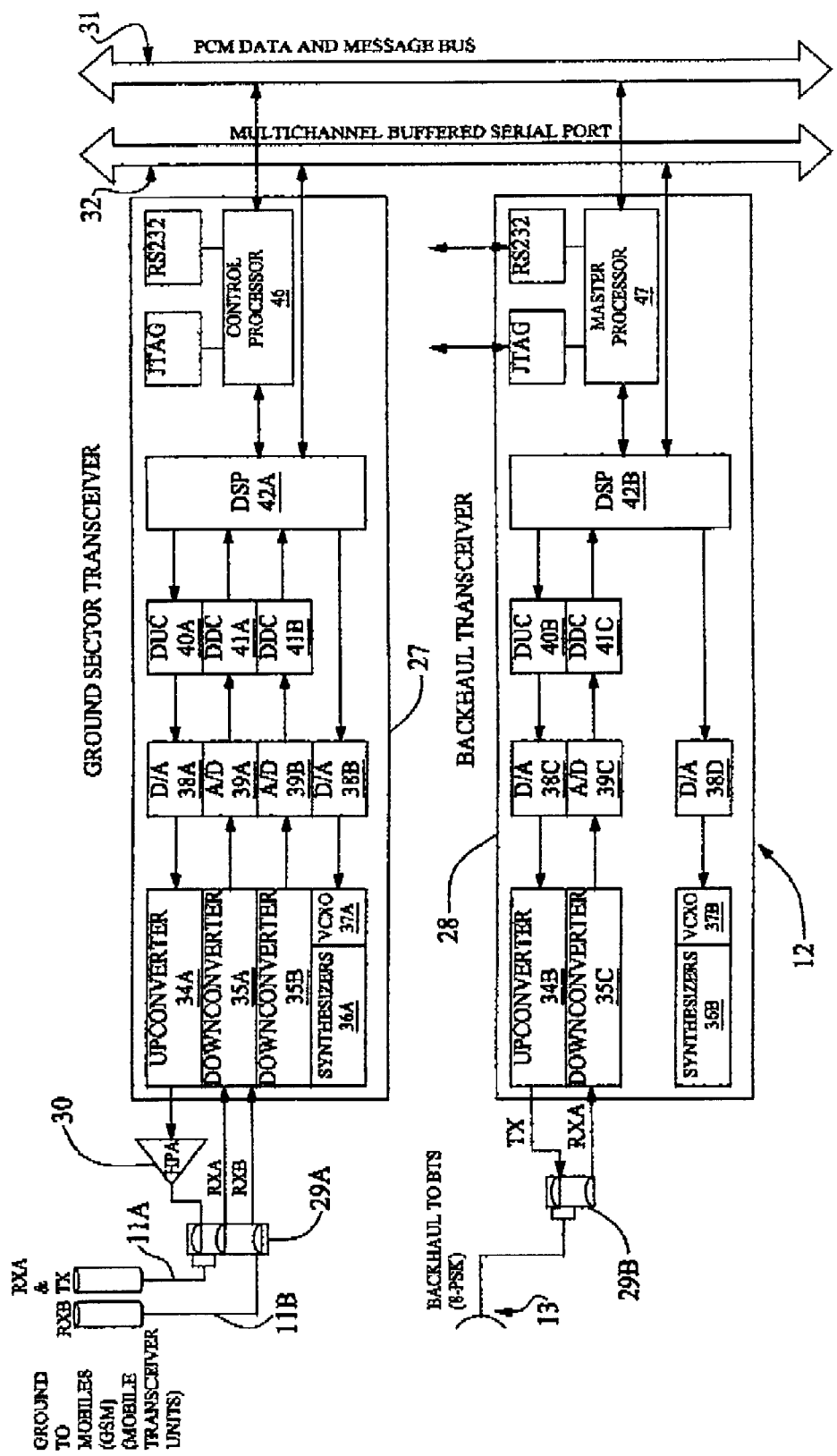
FIG. 4 is a block diagram of an exemplary single omni-directional type translating repeater station of the type shown in the wireless communication system of FIG. 1.

FIG. 4 is a detailed block diagram block of a translating repeater station 12 that can be used in connection with the present invention. The translating repeater station 12 can comprise a ground sector transceiver 27 and backhaul transceiver 28. It will readily be appreciated by those skilled in the art that other types of transceiver architectures may be used to practice the invention and the particular transceiver architecture as described herein is not intended be a limitation on the invention.

In a preferred embodiment, transceivers 27 and 28 are each capable of transmitting and receiving over a broad range of carrier frequencies allocated to a service provider for multi-carrier operation. However, the invention is not limited in this regard and more narrowbanded transceivers can also be used for the purposes of the present invention. Transceiver 27 and 28 are preferably configured so that their operation can be controlled by control processor and master processor 46 and 47, respectively.

FIG. 4 shows a single sector omni directional-type wireless translating repeater system, it being understood that the invention is not so limited. In fact, a variety of sectorized translating repeater stations can also be used for this purpose. Signals from a mobile unit 18 are received at omni-directional antennas 11A and/or 11B attached to ground sector transceiver 27. These signals are encoded and transmitted by mobile unit 18 using a standard wireless telephony format such as GSM and typically range in power from between about −111 to −25 dBm. The signal passes through cavity filter 29A on to downconverter 35A or, alternatively, 35B where, in conjunction with synthesizer module 36A and voltage-controlled crystal oscillator 37A, the signal is mixed down to intermediate frequency or IF. A high-speed analogto-digital converter 39A (or 39B) then converts the analog IF signal into a digital signal. Once the IF signal is digitized, digital downconverter 41A (or 41B) translates the signal down to complex baseband. Digital downconverter 41 preferably provides the ability to downconvert, decimate, filter, and control the gain of the signal. After being converted to a complex baseband, the signal is demodulated by digital signal processor 42A. Digital signal processor 42A is configured for decoding the received signal data from the standard wireless telephony format, such as GSM, to a common format used internally within the translating repeater station.

The common format data is then transferred to digital signal processor 42B in the backhaul transceiver 28 over multi-channel buffered serial port 32. Subsequently, the signal is re-modulated by digital signal processor 42B. The re-modulated signal is output as a complex baseband signal and translated to real IF by digital upconverter 40B. After the signal is translated to real IF, digital-to-analog converter 38C converts the signal back to an analog signal where it is mixed by upconverter 34B in conjunction with synthesizer module 36B and voltage-controlled crystal oscillator 37B. Now ready to be broadcast, the signal passes through cavity filter 29B and is transmitted through the backhaul channel to the BTS 15 through directional antenna 13.

The transceivers 27 and 28 are preferably controlled by one or more control circuits. The control circuits can be in the form of general purpose computer interfaced with the transceiver, a programmable microprocessor integrated with the transceivers with appropriate software, a hardware based controller, or any other combination of microprocessors, electronic circuitry, and programming as may be necessary or appropriate for controlling the first and second transceivers.

As shown in FIG. 4, the control circuits include master processor 47 and control processor 46. Master processor 47 preferably controls the operation of backhaul transceiver 28, including selection of transmit and receive frequencies. Master processor 47 is also linked with PCM data and message bus 31 so that it can communicate with control processor 46, and vice versa. Control processor 46 is preferably a slave processor controlled by master processor 47. Control processor 46 can also preferably control the operation of ground sector transceiver 27, including selection of transceiver receive and transmit frequencies.

Translation of the signals transmitted from the BTS 15 through the backhaul channel is similar to the procedure employed to translate signals transmitted from the mobile units 18. Specifically, a signal, preferably at −70 dBm but typically ranging anywhere from −111 dBm to −25 dBm, is received from a BTS 15 at directional antenna 13 attached to backhaul transceiver 28. The signal passes through cavity filter 29B to downconverter 35C where, in conjunction with synthesizer module 36B and voltage-controlled crystal oscillator 37B, the signal is mixed down to IF. Analog-to-digital (A/D) converter 39C converts the analog IF signal to a digital signal where it is subsequently processed by digital downconverter 41C to complex baseband.

Once converted into complex baseband, the signal is demodulated by digital signal processor 42B and transferred to digital signal processor 42A over multi-channel buffered serial port 32. The signal is then re-modulated by digital signal processor 42A and translated from complex baseband to real IF by digital upconverter 40A. After the signal is translated to real IF, digital-to-analog converter 38A converts the signal back to an analog signal. Upconverter 34A, synthesizer 36A, and voltage-controlled crystal oscillator 37A operate together to mix the signal for transmission. The signal is then amplified by high-power amplifier 30, filtered by cavity filter 29A and transmitted from omni-directional antenna 11A to the mobile unit 18 through the ground link channel.

Figure 5:
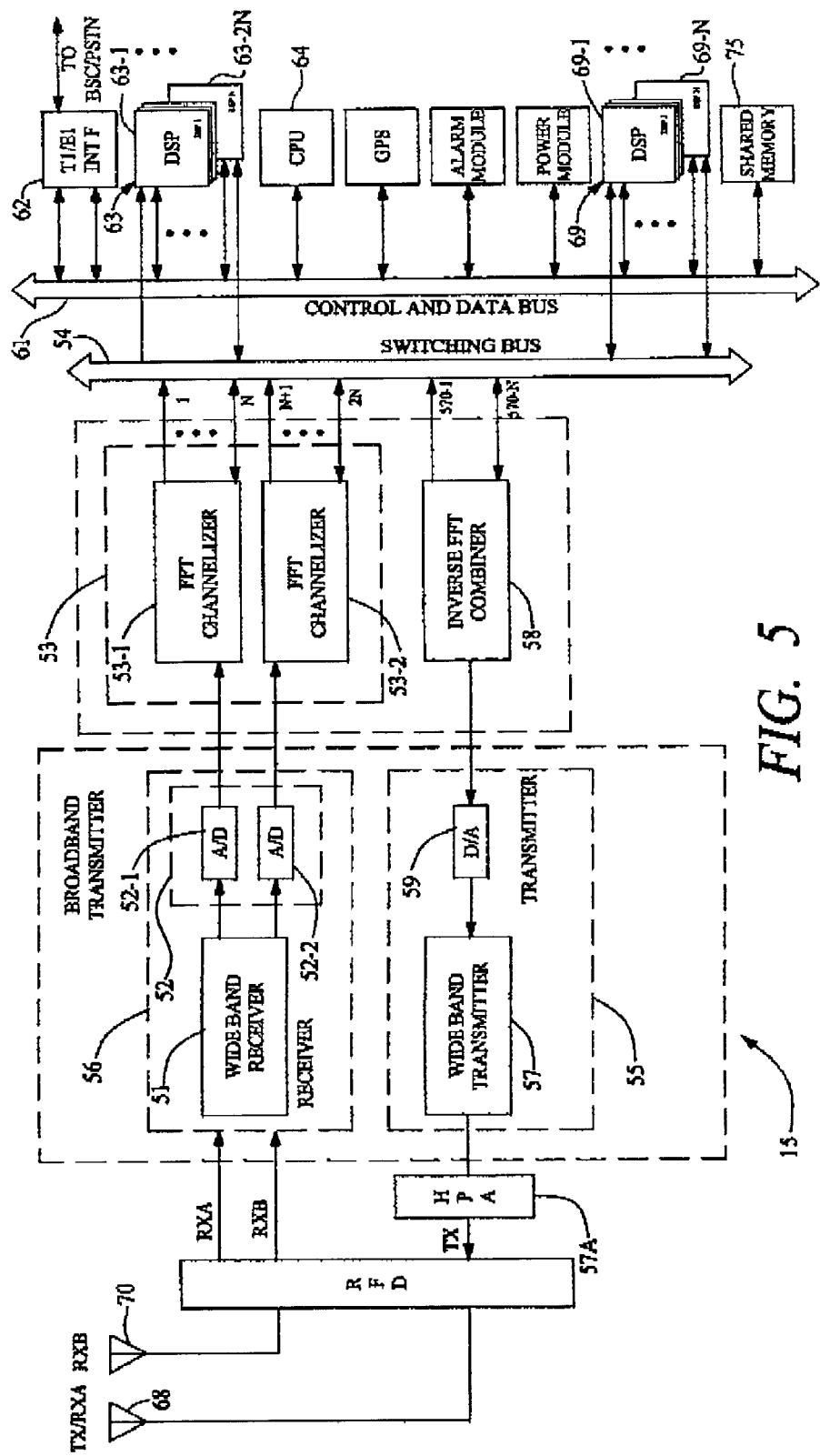
FIG. 5 is a block diagram of an exemplary base transceiver station of the type shown in the wireless communication system of FIG. 1.

Referring now to FIG. 5, a broadband BTS 15 is illustrated, which comprises a receiver section 56 and a transmitter section 55. It will be readily appreciated by those skilled in the art that the particular transceiver architecture shown is not critical. Accordingly, the invention disclosed herein is not intended to be so limited. Receiver section 56 preferably includes antennas 68 and 70 and a wideband receiver 51 capable of receiving a plurality of carrier frequency channels. Signals from the received channels can include new power requests, power adjustment requests and traffic channel data from mobile transceiver units. The term "wideband," as used herein, is not limited to any particular spectral range, and it should be understood to imply a spectral coverage of multiple frequency channels within the communication range over which a wireless communication system may operate (e.g. 5 MHZ or 12 MHZ). Narrowband, on the other hand, implies a much smaller portion of the spectrum, for example, the width of an individual channel (e.g. 30 kHz or 200 kHz).

The output of the wideband receiver 51 is downconverted into a multi-channel baseband signal that preferably contains the contents of all of the voice/data carrier frequency channels currently operative in the communication system or network of interest. This multichannel baseband signal is preferably coupled to high speed A/D converters 52-1 and 52-2 operating in parallel for diversity receive capability. Where no diversity capability is required, a single A/D 52-1 could be utilized. Additionally, more than one parallel leg may be required for sectorized applications. Hence, it should readily be appreciated by one skilled in the art that the presence of a second parallel processing leg is not intended to be a limitation on the instant invention. The dynamic range and sampling rate capabilities of the A/D converter 52 are sufficiently high (e.g. the sampling rate may be on the order of 25 to 50 Mega-samples per second (Msps)) to enable downstream digital signal processing (DSP) components, including Fast Fourier Transform (FFT) channelizers 53-1 and 53-2, to process and output each of the active channels received by receiver 56.

The channelized outputs from the A/D converters are further processed to extract the individual channel components for each of the parallel streams. FFT channelizers 53-1 and 53-2 extract from the composite digitized multichannel signals, respective narrowband carrier frequency channel signals. These narrowband signals are representative of the contents of each of the respective individual carrier frequency communication channels received by the wideband receiver 51. The respective carrier frequency channel signals are coupled via N output links through a common data bus 61 to respective digital signal processing receiver units 63-1 . . . 63-N, each of which demodulates the received signal and performs any associated error correction processing embedded in the modulated signal. In the case where the received signals are destined for the PSTN, these demodulated signals derived from the digital signal processing receiver units 63 can be sent via a common shared bus 54 to a telephony carrier interface, for example, T1 carrier digital interface 62, of an attendant telephony network (not shown).

The transmitter section 55 includes a second plurality of digital signal processing units, specifically, transmitter digital signal processing units 69-1 . . . 69-N, that are coupled to receive from the telephony network respective ones of a plurality of channels containing digital voice/data communication signals to be transmitted over respectively different individual carrier frequency channels of the multichannel network. Transmitter digital signal processing units 69 modulate and perform pre-transmission error correction processing on respective ones of the plurality of incoming communication signals, and supply processed carrier frequency channel signals over the common bus 54 to respective input ports of an inverse FFT-based multichannel combiner unit 58. The combiner 58 outputs a composite multichannel digital signal. This composite signal is representative of the contents of a wideband signal which contains the respective narrowband carrier frequency channel signals output from the digital signal processing transmitter units 69. A composite signal generated from the output of the multichannel combiner unit 58 is then processed by the digital-to-analog (D/A) converter 59. The output of D/A converter 59 is coupled to a wideband (multichannel) transmitter unit 57, which can include or have a separate multichannel high power amplifier (HPA) 57A. The transmitter unit 57 transmits a wideband (multichannel) communication channel signal defined by the composite signal output of the inverse fast Fourier transform-based combiner unit 58. The output of the HPA 57A is then coupled to antenna 68 for transmission.

A central processing unit (CPU) controller 64 is provided for coordinating and controlling the operation of BTS 50. For example, the CPU 64 can include a control processing unit, memory, and suitable programming for responding to transmit power control requests received from mobile transceiver units. CPU 64 can selectively control transmit power levels of each TDM communication channel on a timeslot-by-timeslot basis. The CPU 64 may be a microprocessor, DSP processor, or micro controller having firmware, software, or any combination thereof.

DSPs 63 can extract information from each of the narrowband carrier frequency channel signals. Information for each of these channels can be stored in shared memory 75 through the common control and data bus 61. CPU 64, under firmware and/or software control, can then access the shared memory 75 through bus 61. For example, control channel data concerning a particular downlink or control channel can be received at antenna 70 from a translating repeater station 12 through a backhaul communication link. After the information for each channel in the received signal is processed and separated, DSPs 63 can store the control channel data in the shared memory 75. CPU 64 can then access shared memory 75 to retrieve the control channel data. CPU 64, under software and/or firmware control, can then use this data, for example, as an input to a control algorithm. The output from the algorithm can be stored in shared memory 75 for later use.

Figure 6A:
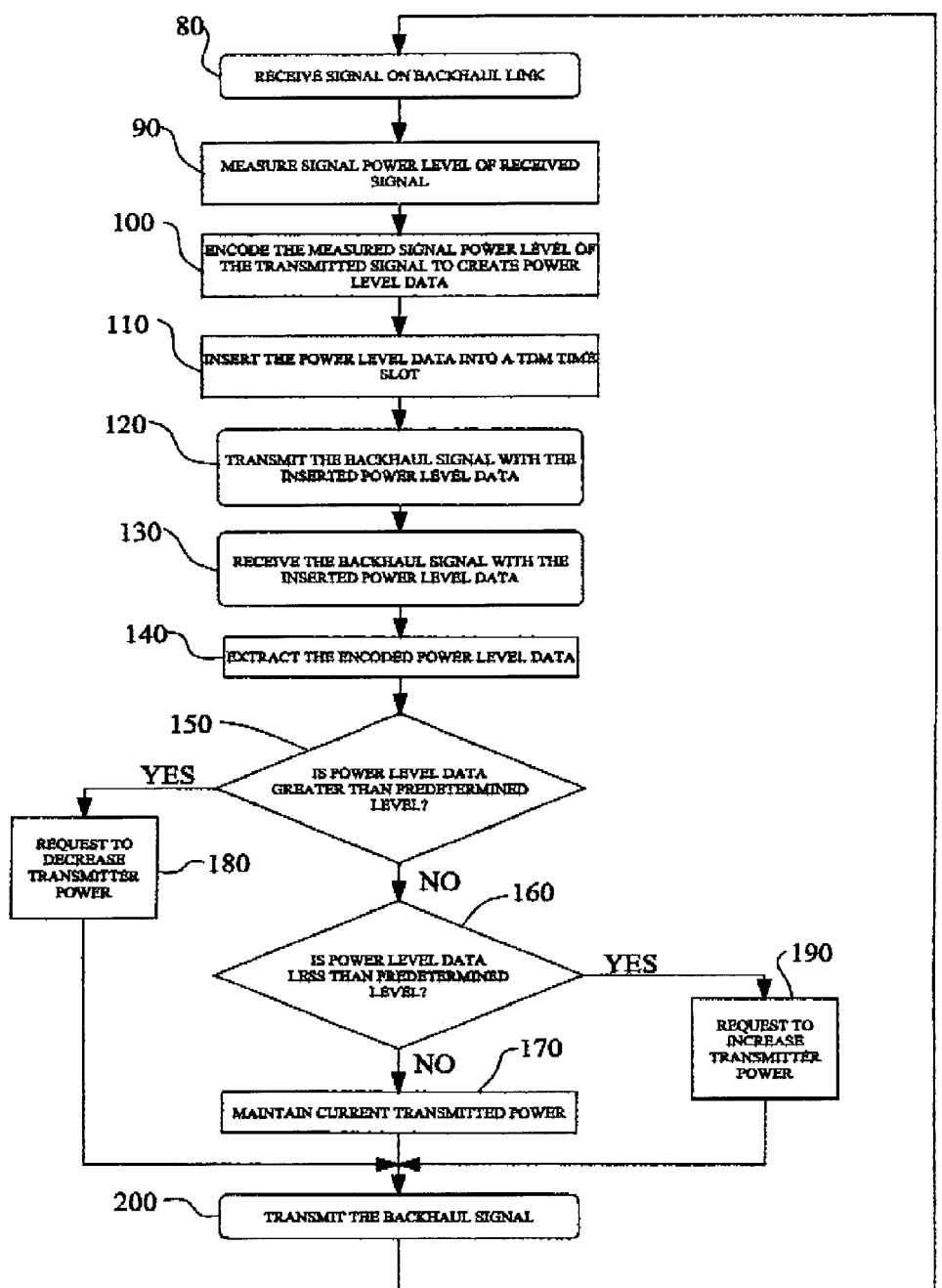
FIG. 6A is a flowchart describing how the backhaul signal power level is dynamically controlled by providing received power level data to the transmitter.

As previously discussed, it is desired to keep signal power levels on the backhaul link 19 within predetermined levels. Referring now to FIG. 6A, a flowchart is shown describing how the signal power levels of the backhaul link 19 can be dynamically controlled to ensure that signal power levels are maintained within these predetermined levels. The process begins in step 80 when a first signal is received by either the translating repeater station 12 or the BTS 15 on the backhaul link 19. In step 90, at periodic intervals, preferably corresponding to a multiframe rate or superframe rate, the signal power level of the received signal is measured. For example, this step can be performed after the incoming signal has been digitally converted by A/D converter 39C of the translating repeater station 12 and A/D converters 52-1, 52-2 of BTS 15.

The digitized signal can then be measured in DSP 42B under the control of master processor 47 in the translating repeater station 12, and DSP(s) 63, under the control of CPU 64 in BTS 15.

Once the received signal power level is measured, the measurement information is encoded to generate power level data, preferably in the form of a digital word, according to step 100. Typically, this step can be performed in DSP 42 in the translating repeater stations 12, and DSP(s) 63 in the BTS 15 by means of a look-up table residing in a non-volatile memory location, or other suitable means. The precise process is not critical provided that the result is a digital word representative of a power level. Proceeding to step 110, the digital power level data is preferably inserted into a TDM-type time slot 22, 23, 25, 26 using techniques which will later be described in more detail. In step 120, the received signal power level of the first signal is then preferably transmitted as a second signal within a TDM time frame 21, 24 over the backhaul link 19 back to the transmitter.

Notably, steps 90–110 are preferably performed after the incoming first signal has been digitally converted in A/D converter 39C of the translating repeater station 12 and A/D converters 52-1, 52-2 of the BTS 15. Once the signal has been converted to a digital format, measurement, encoding, and insertion of the power level data according to steps 90-110 is preferably performed in DSP 42B, under the control of processor 47 in the translating repeater station 12, and DSP(s) 69, under the control of CPU 64 in the BTS 15. However, it should be understood that these functions can be performed in a variety of ways to accomplish the same task using other types of electrical devices and/or software known to those skilled in the art.

Upon receiving the second signal with the inserted power level data in step 130, the translating repeater station 12 or ATS 15 which was the source of the first signal extracts the encoded power level data according to step 140. Once the power level data is extracted, the measured signal power level value is compared to a predetermined signal power level. If the power level data value exceeds a predetermined level in step 150, then the transmitter that produced the first signal referenced above is instructed to decrease its transmitted power so that, in the future, it does not exceed the predetermined level in step 180 For example, if the power level data indicates that the received power of the first signal exceeds a predetermined level by 10 dB, then the transmitter is instructed to decrease the transmit power by 10 dB. Returning to step 150, if the power level data does not exceed a predetermined level, then processing of the power level data continues.

In step 160, if the power level data is less than a predetermined level, then the transmitter is instructed to increase its transmitted power according to step 190 so that the transmitted power level is not less than the predetermined level. Alternatively, in step 160, if the power level data is not less than a predetermined level, then the power level data is within predetermined levels and the transmitter is instructed to maintain the current transmitted power according to step 170. Once the transmitter has adjusted the transmitted signal power level accordingly, the next or subsequent backhaul signal is ready to be transmitted over the backhaul link 19 according to step 200 and the process is repeated.

Steps 140–190 are preferably performed after the incoming signal has been digitally converted in A/D converter 39C of the translating repeater station 12 and A/D converters 52-1, 52-2 of the BTS 15. Once the signal has been converted to a digital format, processing of the signal according to steps 140–190 is preferably performed in DSP 42B, under the control of master processor 47 in the translating repeater station 12, and DSP(s) 63, under the control of CPU 64 in the BTS 15. It should be noted that these steps may be accomplished in other ways readily appreciated by those skilled in the art.

Figure 6B:
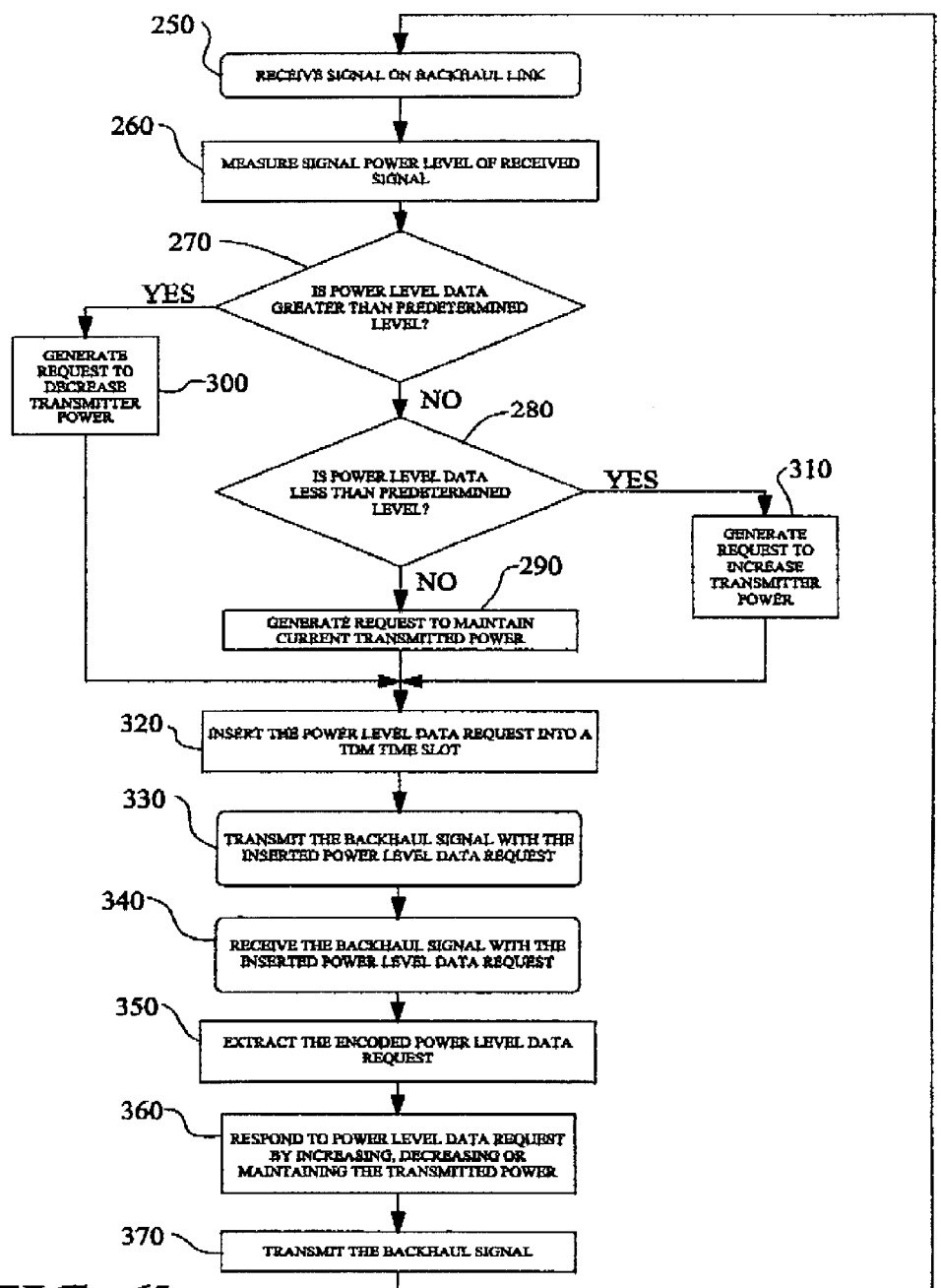
FIG. 6B is a flowchart describing how the backhaul signal power level is dynamically controlled by providing a request to the transmitter to alter its transmitted power.

Referring now to FIG. 6B, a flowchart for an alternate embodiment of the invention is shown. In this embodiment, the signal power level data is a request for the transmitter to alter its transmitted power. The process begins in step 250 when a first signal is received by either the translating repeater station 12 or the BTS 15 on the backhaul link 19. In step 260, at periodic intervals preferably corresponding to a multiframe rate or superframe rate, the receiver of the first signal then measures the signal power level of the received signal. The measured signal power level is then compared to a predetermined signal power level. If the received signal power level of the first signal exceeds a predetermined level in step 270, then a power level data message in the form of a request is generated for the receiving one of the repeater or base station in step 300. The request is for the transmitter to decrease power so that the received signal does not exceed the predetermined level. For example, if the received power level exceeds a predetermined level by 10 dBm, then the receiver generates a power level data message in the form of a request for the transmit power to be decreased by 10 dBm. Returning to step 270, if the power level data does not exceed a predetermined level, then processing of the power level data continues.

In step 280, if the measured power level is less than a predetermined level, then the receiver generates a power level data message in the form of a request for the transmitter to increase its transmitted power in step 310 so that it is not less than the predetermined level. Returning to step 280, if the measured power level is not less than a predetermined level, then the power level is within predetermined levels and the power level data message in the form of a request is generated for the transmitter to maintain the current transmitted power according to step 290.

In step 320, the digital power level data message in the form of a request is preferably inserted into a TDM-type time slot 22, 23, 25, 26, using techniques which shall be more fully discussed later. According to step 330, the received signal power level data message in the form of a request is then preferably transmitted as a second signal within a TDM time frame 21, 24 over the backhaul link 19 back to the transmitter.

Steps 260–320 are preferably performed after the incoming first signal has been digitally converted in A/D converter 39C of the translating repeater station 12 and A/D converters 52-1, 52-2 of the BTS 15. Once the signal has been converted to a digital format, processing of the signal according to steps 270–320 is preferably performed in DSP 42, under the control of processor 47 in the translating repeater station 12, and DSP(s) 63, under the control of CPU 64 in the BTS 15. However, it should be understood that these functions can be performed in a variety of ways to accomplish the same task using other types of electrical devices and/or software known to those skilled in the art.

Upon receiving the backhaul signal with the inserted power level data in step 340, the repeater or base station which was the source of the first signal extracts the encoded power level data in the form of a request according to step 350. Once extracted, the request is processed and the transmitter responds to the request in step 360 by increasing, decreasing, or maintaining the current transmitted power according to the parameters of the request. For example, if the request indicates that the transmit power needs to be increased by 10 dBm, then the transmitter processes this request and increases power by 10 dBm. Once the transmitter has adjusted its signal power level appropriately, the next or subsequent backhaul signal is ready to be transmitted over the backhaul link 19 according to step 370.

Notably, steps 350–360 are preferably performed after the incoming signal has been digitally converted in A/D converter 39C of the translating repeater station 12 and A/D converters 52-1, 52-2 of the BTS 15. Once the signal has been converted to a digital format, processing of the signal according to steps 350–360 is preferably performed in DSP 42B, under the control of master processor 47 in the translating repeater station 12, and DSP(s) 63, under the control of CPU 64 in the BTS 15. However, these processes may be accomplished in other ways readily appreciated by those skilled in the art.

Pursuant to steps 110 and 320 in FIGS. 6A and 6B, the techniques for inserting the referenced power level data into a TDM-type time frame will be described. It should be noted that it is not necessary to update the power level data on a frame-by-frame basis. Typically, power level fluctuations caused by changing atmospheric conditions occur gradually over time compared to TDM frame rates. Therefore, power level data can be effectively updated at longer intervals. For example, the power level data may be inserted into a TDM frame once every multiframe (approximately every 120 milliseconds), or every superframe, (approximately every 6.12 seconds).

Figure 7:
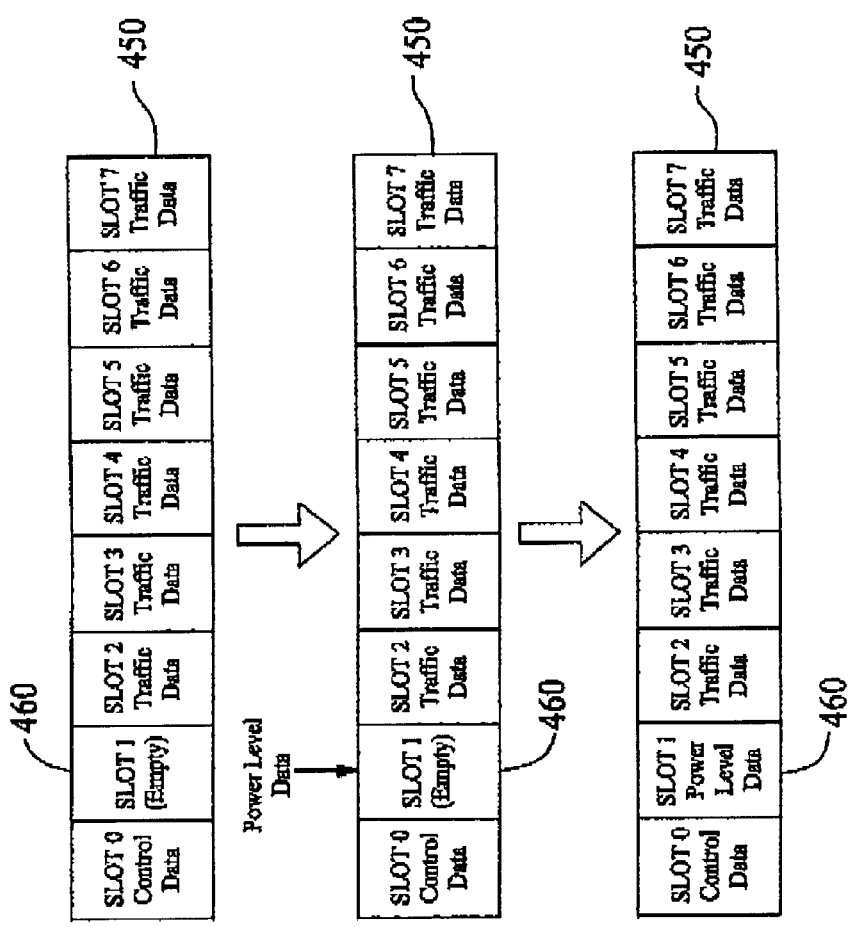
FIG. 7 illustrates an embodiment of a time slot "stealing" scheme in a GSM-type TDM time frame.

Referring now to FIG. 7, one way of inserting the power level data into a TDM-type time frame 450 is shown. In FIG. 7, a typical GSM-type TDM time frame 450 is depicted having seven traffic channel time slots and one control channel time slot. According to one embodiment of the invention, by monitoring the RF or down-converted IF associated with time frame 450, an empty time slot can be identified and the power level data can be inserted into the empty slot. A typical digital cellular TDM time frame 450 may have one or more unused traffic time slots, especially during periods of low subscriber usage. The current invention can take advantage of this by using one of the empty traffic time slots to transmit power level data. Once an available time slot is identified, the digitized power level data can be inserted into the empty slot 460. After the power level data is inserted, the backhaul signal is ready to be transmitted.

Figure 8:
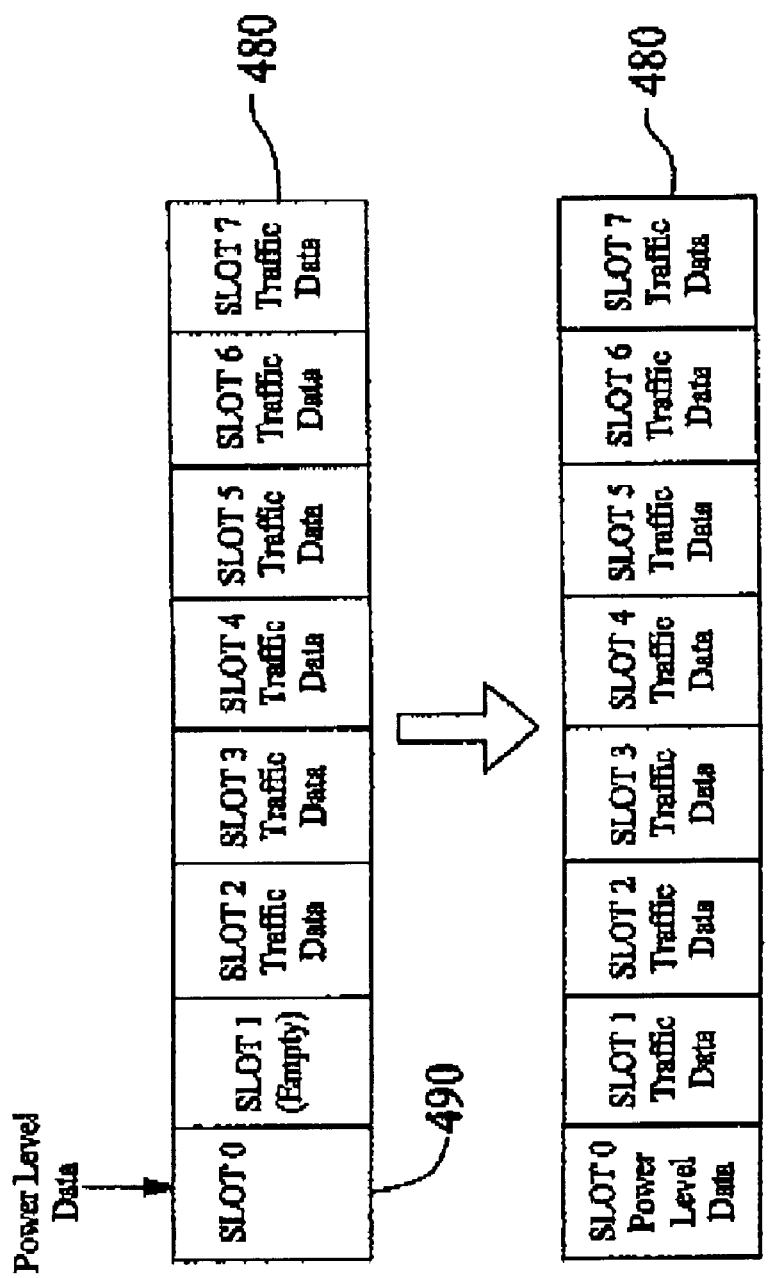
FIG. 8 illustrates an embodiment of a prioritization scheme in a GSM-type TDM time frame.

FIG. 8 depicts yet another way to insert the power level information into the backhaul link by suppressing the current data in one of the time slots. The system can be designed to prioritize the power level data to supercede information in one of the time slots. To prevent disruption of current calls in traffic channel slots, the designated slot will preferably be a control channel slot. However, the information in any of the slots can be suppressed according to this technique. Once the power level data is designated to have priority over one of the time slots, the system can suppress the existing information in the designated slot and insert the prioritized power level data into the slot 490. After the power level data is inserted into the time slot 490, the frame 480 is ready to be transmitted over the backhaul link 19.

The foregoing are suitable for translating repeater station that do not demodulate. In the case of translating repeater station 12 having demodulation capability such as the translating repeater station shown in FIG. 4, the power level data can be inserted in the RACH subchannel or any other available subchannel within the control channel. In addition, the power level data can be inserted into an available traffic time slot subchannel, such as the Slow Associated Control Channel (SACCH).

It should be understood that the examples and embodiments described herein are for illustrative purposes only and that various modifications or changes in light thereof will be suggested to persons skilled in the art and are to be included within the spirit and purview of this application. The invention can take other specific forms without departing from the spirit or essential attributes thereof for an indication of the scope of the invention.

What is claimed is:

1. In a wireless cellular communication system having a base station located within a home cell and at least one substantially adjacent cell having a repeater station located therein for facilitating communication between said base station and a plurality of mobile units located in said adjacent cell, a method for providing dynamic control of signal power levels in a bi-directional time division multiplexed (TDM) backhaul communication link between said base station and said repeater station, comprising:

measuring, in a receiving one of said base station and said repeater station, a received signal power level of a signal transmitted between said base station and said repeater station;

monitoring said bi-directional TDM backhaul communication link to identify an available TDM time slot channel assigned to at least one of said mobile units;

automatically transmitting in said TDM time slot power level data based on said received signal power level from said receiving one of said base station and said repeater which was the source of said measured signal measurement; and receiving said power level data at said source of said measured signal.

2. The method according to claim 1, further comprising automatically adjusting the power level transmitted by said source of said measured signal when said power level data indicates that said received signal power level has deviated from a predetermined power level.

3. The method according to claim 1, wherein said power level data indicates said received signal power level.

4. The method according to claim 1, wherein said power level data is a request for said source to control the transmitted power for at least one of increasing, decreasing, or maintaining said transmitted power.

5. The method according to claim 1, wherein said available time slot is a mobile unit control channel time slot.

6. The method according to claim 1, further comprising prioritizing said power level data to selectively supercede information in said TDM time slot.

7. The method according to claim 6, further comprising suppressing data received from said mobile units in said TDM time slot when transmitting said power level data.

8. The method according to claim 7, wherein said at least one of said TDM time slots is a control channel time slot.

9. In a wireless cellular communication system having a base station located within a home cell and at least one substantially adjacent cell having a repeater station located therein for facilitating communication between said base station and a plurality of mobile units in said adjacent cell, apparatus for providing dynamic control of signal power levels in a bi-directional time division multiplexed (TDM) backhaul communication link between said base station and said repeater station, comprising:

signal power measurement means for measuring, in a receiving one of said base station and said repeater station, a received signal power level of a signal transmitted between said base station and said repeater station;

means for monitoring said bi-directional TDM backhaul communication link to identify an available TDM time slot channel assigned to at least one of said mobile units;

means for automatically transmitting in said TDM time slot power level data based on said received signal power level from said receiving one of said base station and said repeater which was the source of said measured signal; and means for receiving said power level data at said source of said measured signal.

10. The apparatus according to claim 9, further comprising a means for automatically adjusting the power level transmitted by said source of said measured signal when said power level data indicates that said received signal power level has deviated from a predetermined power level.

11. The apparatus according to claim 9, wherein said power level data indicates said received signal power level.

12. The apparatus according to claim 9, wherein said power level data is a request for said source to control the transmitted power for at least one of increasing, decreasing, or maintaining said transmitted power.

13. The apparatus according to claim 9, wherein said available time slot is a mobile unit control channel time slot.

14. The apparatus according to claim 9, further comprising prioritizing said power level data to selectively supercede information in said TDM time slot.

15. The apparatus according to claim 14, further comprising suppressing data received from said mobile units in said TDM time slot when transmitting said power level data.

16. The apparatus according to claim 15, wherein said at least one of said TDM time slots is a control channel time slot.

17. In a wireless cellular communication system having a base station located within a home cell and at least one substantially adjacent cell having a repeater station located therein for facilitating communication between said base station and a plurality of mobile units in said adjacent cell, apparatus for providing dynamic control of signal power levels in a bi-directional time division multiplexed (TDM) communication link between said base station and said repeater station, comprising:

signal power measurement means for measuring, in a receiving one of said base station and said repeater station, a received signal power level of a signal transmitted between said base station and said repeater station;

a station controller for receiving a signal power level measurement result from said signal power measurement means to provide a corresponding power level data;

channel monitoring means for monitoring said bi-directional TDM backhaul communication link to identify an available TDM time slot channel assigned to at least one of said mobile units;

a transmitter responsive to said station controller for transmitting in said TDM time slot said power level data from said receiving one of said base station and said repeater which was the source of said measured signal; and means for receiving said power level data at said source of said measured signal.

* * * * *

UNITED STATES PATENT AND TRADEMARK OFFICE
CERTIFICATE OF CORRECTION

PATENT NO. : 6,687,509 B2
DATED : February 3, 2004
INVENTOR(S) : Schmutz, Thomas R. and Komara, Michael A.

It is certified that error appears in the above-identified patent and that said Letters Patent is hereby corrected as shown below:

Column 10,
Line 37, delete "ATS" and replace with -- BTS --.
Line 45, add a period after the number -- 180 --.

Column 13,
Line 28, delete "measurement".

Column 14,
Line 39, add -- backhaul -- after "(TDM)".

Signed and Sealed this

Third Day of August, 2004

JON W. DUDAS
*Acting Director of the United States Patent and Trademark Office*